US011061706B2

(12) United States Patent
Wellum et al.

(10) Patent No.: US 11,061,706 B2
(45) Date of Patent: Jul. 13, 2021

(54) METHOD OF TRACKING USAGE OF VIRTUAL MACHINES

(71) Applicant: Cisco Technology, Inc., San Jose, CA (US)

(72) Inventors: Richard Wellum, Apex, NC (US); Alpesh Patel, Cary, NC (US); Jose Palafox, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 537 days.

(21) Appl. No.: 15/400,025

(22) Filed: Jan. 6, 2017

(65) Prior Publication Data

US 2018/0196686 A1    Jul. 12, 2018

(51) Int. Cl.
| | |
|---|---|
| *G06F 9/455* | (2018.01) |
| *H04L 29/12* | (2006.01) |
| *H04L 29/08* | (2006.01) |
| *G06F 11/34* | (2006.01) |
| *G06F 11/30* | (2006.01) |

(52) U.S. Cl.
CPC ........ *G06F 9/45558* (2013.01); *G06F 11/301* (2013.01); *G06F 11/302* (2013.01); *G06F 11/3089* (2013.01); *G06F 11/34* (2013.01); *G06F 11/3495* (2013.01); *H04L 61/1511* (2013.01); *H04L 67/22* (2013.01); *G06F 9/45533* (2013.01); *G06F 2009/4557* (2013.01); *G06F 2009/45591* (2013.01); *G06F 2009/45595* (2013.01); *G06F 2201/815* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 5,023,907 | A  * | 6/1991 | Johnson | G06F 21/105 |
| | | | | 710/200 |
| 6,959,291 | B1 * | 10/2005 | Armstrong | G06F 21/10 |
| | | | | 705/59 |
| 7,653,700 | B1 * | 1/2010 | Bahl | H04L 29/12009 |
| | | | | 709/216 |
| 9,374,244 | B1 * | 6/2016 | Brandwine | H04L 63/0823 |
| 9,659,156 | B1 * | 5/2017 | Jing | G06F 21/14 |
| 2004/0128670 | A1 | 7/2004 | Robinson et al. | |

(Continued)

OTHER PUBLICATIONS

Extended European Search Report from the European Patent Office, dated May 22, 2018, 8 pages, for the corresponding European Patent Application No. EP 18150272.5.

(Continued)

*Primary Examiner* — Hiren P Patel
(74) *Attorney, Agent, or Firm* — Polsinelli PC

(57) ABSTRACT

A method for tracking virtual machine usage includes deploying, by a client machine with a client Internet Protocol (IP) address, an instance of a virtual machine. The client machine generates an identification for the instance of the virtual machine and requests a domain name system (DNS) lookup for a domain name string from a tracker server specified by a tracker IP address, where the domain name string comprises the identification. The tracker server receives the DNS lookup from the client machine and records the identification and the client IP address.

19 Claims, 5 Drawing Sheets

(56) References Cited

U.S. PATENT DOCUMENTS

| | | | |
|---|---|---|---|
| 2004/0215823 A1* | 10/2004 | Kleinfelter | H04L 29/12066 709/245 |
| 2004/0250129 A1* | 12/2004 | Clough | H04L 63/08 726/4 |
| 2007/0234302 A1* | 10/2007 | Suzuki | G06F 8/61 717/126 |
| 2007/0245338 A1* | 10/2007 | Musha | G06F 9/5055 717/173 |
| 2007/0300220 A1* | 12/2007 | Seliger | G06F 8/61 718/1 |
| 2008/0250407 A1* | 10/2008 | Dadhia | G06F 9/45533 718/1 |
| 2009/0241167 A1* | 9/2009 | Moore | H04L 29/12066 726/1 |
| 2009/0300607 A1* | 12/2009 | Ferris | G06F 9/45558 718/1 |
| 2010/0131948 A1* | 5/2010 | Ferris | G06F 9/50 718/1 |
| 2011/0004735 A1* | 1/2011 | Arroyo | G06F 9/455 711/162 |
| 2011/0153864 A1 | 6/2011 | Prasad et al. | |
| 2011/0196968 A1* | 8/2011 | Kobayashi | G06F 9/5077 709/226 |
| 2011/0320524 A1* | 12/2011 | Nandagopal | H04L 29/12066 709/203 |
| 2012/0144391 A1* | 6/2012 | Ueda | G06F 9/45558 718/1 |
| 2012/0254284 A1* | 10/2012 | Tamura | G06F 11/301 709/202 |
| 2012/0254961 A1* | 10/2012 | Kim | H04L 12/66 726/7 |
| 2013/0346966 A1* | 12/2013 | Natu | G06F 9/45558 718/1 |
| 2014/0067914 A1* | 3/2014 | Nishii | H04L 67/1008 709/203 |
| 2014/0122427 A1* | 5/2014 | Dary | G06F 16/20 707/620 |
| 2014/0245297 A1* | 8/2014 | Hackett | G06F 9/5077 718/1 |
| 2014/0281032 A1* | 9/2014 | Roskind | H04L 61/1511 709/245 |
| 2014/0310409 A1* | 10/2014 | Ohsuga | G06F 11/3065 709/224 |
| 2015/0058580 A1* | 2/2015 | Lagar Cavilla | G06F 3/0673 711/149 |
| 2015/0215276 A1* | 7/2015 | Bhagwat | H04L 61/2015 709/220 |
| 2015/0281111 A1* | 10/2015 | Carl | H04L 47/70 709/226 |
| 2016/0062783 A1* | 3/2016 | Falkco | G06F 9/45558 718/1 |
| 2016/0147550 A1* | 5/2016 | McWilliams | G06F 9/45558 718/1 |
| 2016/0162666 A1* | 6/2016 | Casey | G06F 9/45558 726/29 |
| 2016/0205062 A1* | 7/2016 | Mostert | H04L 61/1511 709/245 |
| 2018/0091538 A1* | 3/2018 | Narayanan | H04W 12/02 |
| 2018/0098218 A1* | 4/2018 | Fogle-Weekley | H04W 12/0023 |

OTHER PUBLICATIONS

Communication pursuant to Article 94(3) EPC, issued by the European Patent Office dated Mar. 5, 2021, 5 pages, for corresponding EP Application No. EP 18150272.5.

Author Unknown, "Internet—Wikipedia," Nov. 1, 2008, 17 pages.

* cited by examiner

400

┌─ 410

RECEIVING A NAME SERVER LOOKUP FROM A CLIENT MACHINE LOCATED AT A CLIENT INTERNET PROTOCOL (IP) ADDRESS, WHEREIN THE NAME SERVER LOOKUP COMPRISES AN IDENTIFICATION FOR AN INSTANCE OF A VIRTUAL MACHINE (VM) ON THE CLIENT MACHINE

┌─ 420

GENERATING AN IDENTIFICATION FOR THE INSTANCE OF THE VIRTUAL MACHINE

┌─ 430

REQUESTING A NAME SERVER LOOKUP FROM A TRACKER SERVER SPECIFIED BY A TRACKER IP ADDRESS, WHEREIN THE NAME SERVER LOOKUP COMPRISES THE IDENTIFICATION

FIG. 4

METHOD OF TRACKING USAGE OF VIRTUAL MACHINES

BACKGROUND OF THE INVENTION

Field of the Invention

This application relates to monitoring software usage, and more particularly to a system and method for tracking usage of distributed software for virtual machines.

Description of the Related Art

To expand the number of operating systems and application programs that can run on a machine such as a computer system or a router, a field of technology has developed in which a given machine, called a host, will include an emulator program that allows the host to emulate other computing device configurations. The host can both run software configured for its native hardware and software configured for computers having different hardware configurations.

When a guest system is emulated on a host, the guest system is called a "virtual machine" as the guest system only exists in the host as a software representation of the operation of one specific hardware configuration that may diverge from the native machine. The virtual machine presents to the software operating on the virtual machine an emulated hardware configuration.

The increasing popularity of downloaded software creates new opportunities for software vendors. Unfortunately, the Internet also creates new challenges for software vendors, such as monitoring or tracking the installation or use of the distributed software. In addition, unauthorized copying or other misuse of downloaded software in violation of copyright laws reduces potential licensing revenues.

Still another challenge for software vendors is acquiring the quantity and quality of data on the use of their product required to improve the quality of their product and to efficiently spend their development and marketing resources. Software vendors desire to know how many copies of each application are actually used, how often and how long each user uses their software application, what features are most valuable to users, and other types of demographic data. However, it can be expensive and difficult for software vendors to obtain accurate data which would assist them to improve their products or to more efficiently focus their development and marketing efforts.

BRIEF DESCRIPTION OF THE DRAWINGS

These and other sample aspects of the present technology will be described in the detailed description and the appended claims that follow, and in the accompanying drawings, wherein:

FIG. 4 illustrates an example methodology for tracking usage of virtual machines by a tracker server.

BRIEF INTRODUCTION

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later. In accordance with one or more aspects of the examples described herein, systems and methods are provided for tracking usage of distributed software for virtual machines.

The subject disclosure provides a method for tracking virtual machine usage. A client machine with a client Internet Protocol (IP) address deploys an instance of a virtual machine. The client machine generates an identification for the instance of the virtual machine and requests a domain name system (DNS) lookup for a domain name string from a tracker server specified by a tracker IP address, where the domain name string comprises the identification. The tracker server receives the DNS lookup from the client machine and records the identification and the client IP address.

DETAILED DESCRIPTION

The subject disclosure provides techniques for tracking usage of distributed software for virtual machines, in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Figure 1:
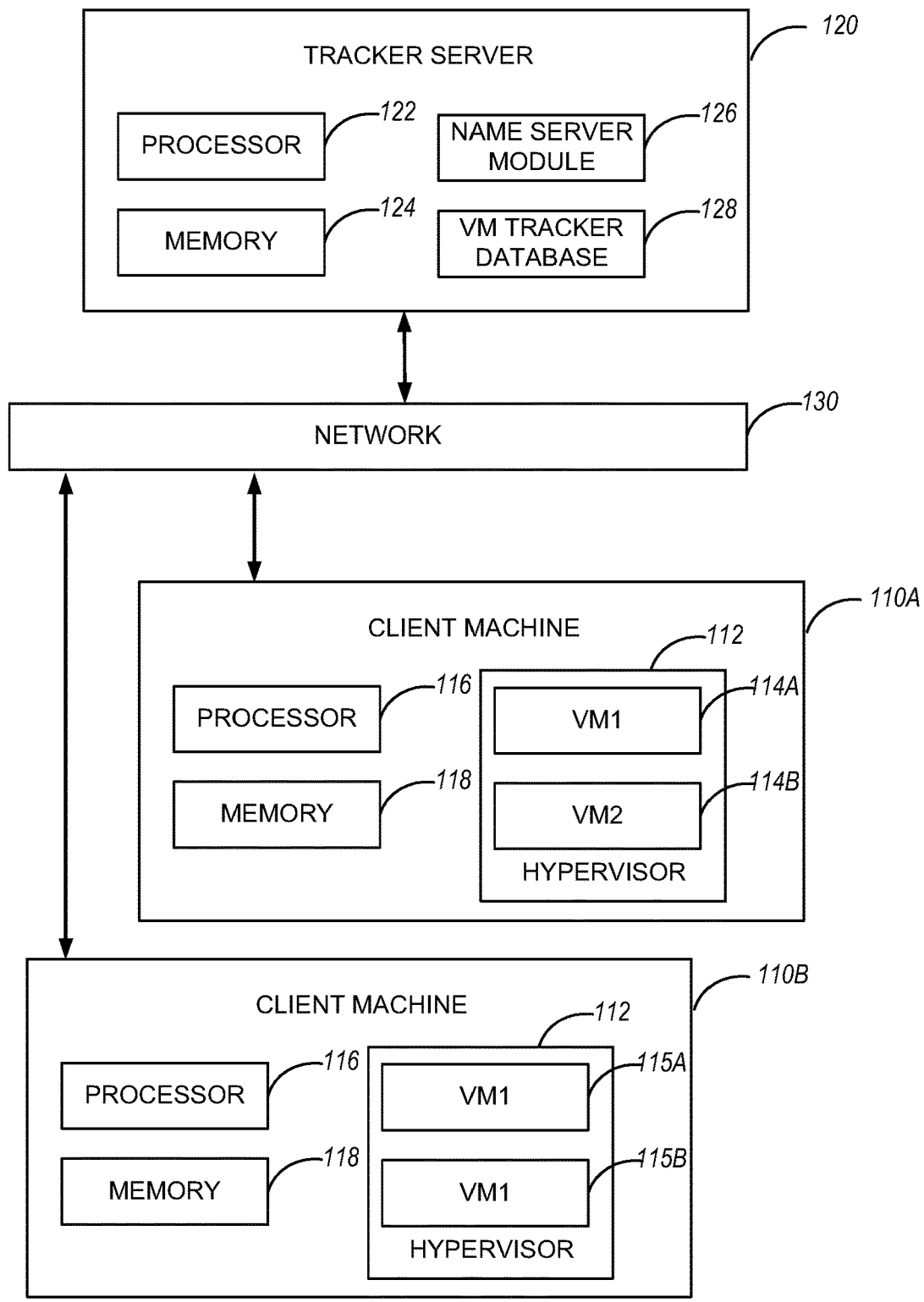
FIG. 1 illustrates a block diagram of an example system for tracking usage of virtual machines.

FIG. 1 illustrates a block diagram of an example system 100 for tracking usage of virtual machines. The system 100 includes a tracker server 120 connected to one or more client machines 110 via a network 130. The network 130 is a wide area network (WAN) such as the Internet.

The client machine 110 is a device or multiple devices capable of deploying a virtual machine (VM). For example, the client machine 110 can include, a desktop computer, a server computer, a laptop computer, a mobile device, a tablet computer, a smart phone, a network router, a network switch, etc. In some implementations, the client machine 110 includes a processor 116, a memory 118, and a hypervisor 112.

The hypervisor 112 is a piece of computer software, firmware, or hardware that creates and runs virtual machines. The hypervisor presents the client machine 110A, 110B with a virtual operating platform and manages the execution of the operating systems for the virtual machines. Multiple instances of a variety of operating systems may share the virtualized hardware resources: for example, Linux, Windows, and OS X instances can all run on a single physical x86 machine.

A VM is a software emulation of a particular physical device. VMs operate based on the computer architecture and functions of a real or hypothetical device, and their implementations may involve specialized hardware, software, or a combination of both. Each VM can run an individual and separate OS from every other VM. In this manner multiple VMs can be emulated using a single client machine 110. In some implementations, the hypervisor 112, launches an OS on each of the VMs.

For example the VM can be an emulation of a network router. A router is a networking device that forwards data packets between computer networks. Routers perform the traffic directing functions on the Internet. A data packet is typically forwarded from one router to another through the networks that constitute the internetwork until the data packet reaches its destination node. A router is connected to two or more data lines from different networks. When a data packet comes in on one of the lines, the router reads the address information in the packet to determine the ultimate destination. Then, using information in the router's routing table or routing policy, the router directs the packet to the next network.

The client machine 110 can deploy an instance of a VM with the hypervisor 112. An image of the VM may be stored on the client machine 110 or can be obtained over network such as the Internet or a local area network (LAN). For example, as shown in FIG. 1, the hypervisor 112 of client machine 110A deploys VM1 114A and deploys VM2 114B. VM1 and VM2 may be two different VM versions. The hypervisor 112 of client machine 110B deploys two instances of VM1 115A, 115B, which are two instances of a same VM version. Multiple instances of one or more VM version can run simultaneously. Multiple instances of one or more VM version can also be run at different times.

In some implementations, the client machine 110 performs configuration for any new instance of a VM, at startup of the VM. As a part of the configuration process, the client machine 110 generates a unique identifier for the new instance of the VM. Further, the client machine 110 generations additional unique identifiers for new instances of VMs. In some implementations, each unique identifier is unique to a particular instance of a particular VM version.

In some implementations, the client machine 110 generates a random string of a determined length as the unique identifier for the instance of the VM. For example, the random string can include ten randomly generated alphanumeric characters.

As another part of the configuration process, the client machine 110 parses a Domain Name System (DNS) resolver configuration file stored on the image of the VM. In some implementations, the DNS resolver configuration file specifies the tracker server 120 as a DNS name server.

The Domain Name System (DNS) is a hierarchical decentralized naming system for computers, services, or any resource connected to the Internet or a private network. The DNS associates various information with domain names assigned to each of the participating entities. The DNS translates more readily memorized domain names to the numerical IP addresses needed for the purpose of locating and identifying computer services and devices with the underlying network protocols. The DNS delegates the responsibility of assigning domain names and mapping those names to Internet resources by designating authoritative name servers for each domain. Network administrators may delegate authority over sub-domains of their allocated name space to other name servers.

The process of determining Internet Protocol (IP) addresses from domain names is called resolving The DNS resolver configuration file contains information that determines the operational parameters of the DNS resolver. The DNS resolver allows applications running in the operating system to translate human-friendly domain names into the numeric IP addresses that are required for access to resources on the local area network or the Internet.

For example, the DNS resolver configuration file can be a resolv.conf file. The file resolv.conf typically contains directives that specify the default search domains and is used for completing a given query name to a fully qualified domain name when no domain suffix is supplied. The file also contains a list of IP addresses of name servers available for resolution. For example, the resolv.conf file can include a text line "nameserver 208.67.222.222" that specifies 208.67.222.222 as an IP address of a DNS name server. A fully qualified domain name (FQDN), sometimes also referred to as an absolute domain name, is a domain name that specifies its exact location in the tree hierarchy of the DNS. The file specifies all domain levels, including the top-level domain and the root zone. A fully qualified domain name is distinguished by its lack of ambiguity, in that the domain name can be interpreted only in one way.

A name server is a computer hardware or software server that implements a network service for providing responses to queries against a directory service. For example, the tracker server 120 is a name server. The name server translates an often humanly-meaningful, text-based identifier to a system-internal, often numeric identification or addressing component. This service is performed by the server in response to a service protocol request. DNS servers translate (resolution) human-memorable domain names and hostnames into the corresponding numeric IP addresses, the second principal name space of the Internet which is used to identify and locate computer systems and resources on the Internet. In some implementations, the tracker server 120 is a name server specified by the DNS resolver configuration file by an IP address of the tracker server 120. In some implementations, the IP address of the tracker server 120 is stored on the DNS resolver configuration file (e.g., resolv.conf).

As another part of the configuration process of the instance of the VM, the client machine 110 requests a name server lookup (i.e., DNS lookup) with the tracker server 120. A name server lookup is the process by which a DNS record is returned from a DNS name server, such as the tracker server 120. Interconnected computers, servers, and smart phones may need to know how to translate the email addresses and domain names people remember and use into meaningful numerical IP addresses. A name server lookup performs this function. For example, the client machine 110 can execute a command such as "nslookup" to perform the name server lookup. Nslookup is a network administration command available for many computer operating systems for querying a DNS name server to obtain domain name or IP address mapping or for any other specific DNS record.

In some implementations, the client machine 110 executes a nslookup command string. For example, the nslookup command string can be "nslookup <ID>.xrv9k.cisco.com 208.67.22.222", where "<ID>" refers to the unique identifier generated by the client machine 110 for the instance of the VM. The nslookup command string "<ID>.xrv9k.cisco.com 208.67.22.222" includes the unique identifier (<ID>), the domain name of the tracker server 120 (xrv9k.cisco.com), and the IP address of the tracker server (208.67.22.222). In some implementations, the name server lookup command, including the domain name of the tracker server 120 and the IP address of the tracker server 120, are stored on the image of the VM.

The tracker server 120 includes a processor 122, a memory 124, a name server module 126, and a VM tracker database 128. The name server module 126 of the tracker server 120 receives and processes the name server lookup from the client machine 110. Additionally, the VM tracker database 128 of the tracker server 120 records statistics related to VM use by the client machine 110.

In some implementations, the tracker server 120 records a number of times that a particular VM version has been started (i.e., the number of instances of the VM) by a particular client machine. For example, if a client machine starts two instances of a VM simultaneously, the tracker server 120 will record two different instances of the VM for the client machine. In another example, the client machine starts an instance of the VM, then turns off and restarts the instance, the tracker server 120 will record two of the same instance of the VM for the client machine.

In some implementations, the tracker server 120 records a total number of instances of a particular VM version, by the client machines 110A, 110B as well as other client machines not shown. In some implementations, the tracker server 120 records a number of VM deployments from a particular client machine.

Figure 2:
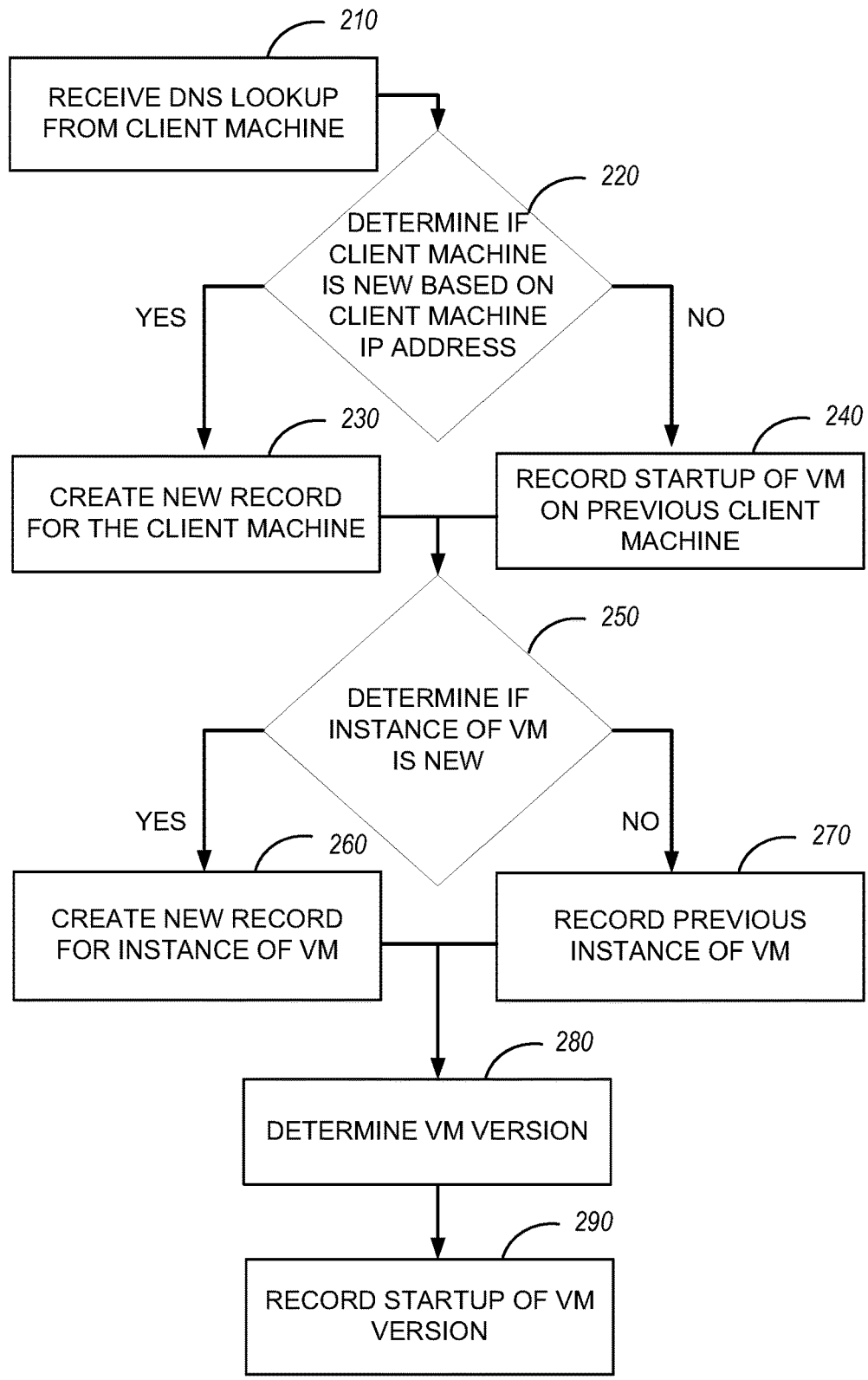
FIG. 2 illustrates a flow diagram of an example method tracking usage of virtual machines.

FIG. 2 illustrates a flow diagram 200 of an example method tracking usage of virtual machines, by a tracker server. At step 210, the tracker server (e.g., the tracker server 120 of FIG. 1), receives a name server lookup request from an instance of a VM on a client machine (e.g., the client machine 110A or 110B of FIG. 1). For example, the name server lookup request can be "nslookup <ID>.xrv9k.cisco.com 208.67.22.222", which includes the unique identifier (<ID>), the domain name of the tracker server 120 (xrv9k.cisco.com), and the IP address of the tracker server (208.67.22.222).

At step 220, the tracker server 120 determines if the client machine that sent the DNS lookup is new or a client machine that has been previously recorded. In some implementations, the tracker server 120 determines whether the client machine is new by comparing the IP address of the client machine with IP addresses of client machines stored in the VM tracker database 128.

If the client machine is new, at step 230, the tracker server 120 creates a new record for the client machine. If the client machine is not new, at step 240, the tracker server 120 records statistics related to the DNS lookup to a previously created record for the client machine.

At step 250, the tracker server 120 determines whether the instance of the VM on the client machine is new. In some implementations, the tracker server 120 compares the unique identifier of the instance of the VM to unique identifiers stored in the in the VM tracker database 128 to determine if the instance of the VM is new.

If the instance of the VM is new, at step 260, the tracker server 120 records a new record of the instance of the VM. If the instance of the VM is not new, at step 270, the tracker server 120 records statistics to the DNS lookup to a previously recorded instance of the VM.

At step 280, the tracker server 120 determines the VM version of the instance of the VM. In some implementations, each unique identifier is unique to a particular instance of a particular VM version. The tracker server 120 determines the VM version based on the unique identifier from the DNS request.

At step 290, the tracker server 120 records the instance of the VM for the VM version determined.

Figure 3:
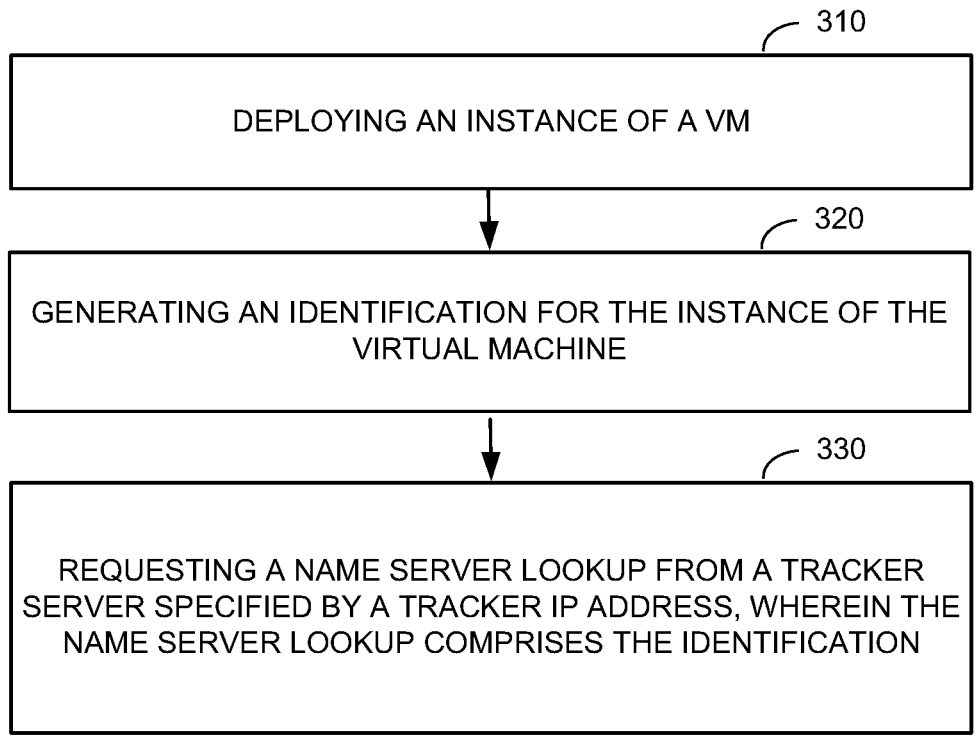
FIG. 3 illustrates an example methodology for tracking usage of virtual machines by a client machine.

FIG. 3 illustrates an example methodology 300 for tracking usage of virtual machines by a client machine. At step 310, the client machine deploys an instance of a VM. In some implementations, the client machine is connected to a wide area network. For example, the client machine receives an image of the virtual machine. The client machine can perform a configuration for the virtual machine.

In some implementations, the client machine 110 can deploy an instance of a VM with the hypervisor 112. An image of the VM may be stored on the client machine 110 or can be obtained over network such as the Internet or a local area network (LAN).

At step 320, the client machine generates an identification for the instance of the virtual machine. In some implementations, the identification is unique to the instance of the virtual machine. Generating the identification can include generating a random string of a determined length. The identification can include a software version of the virtual machine. The identification can include information describing a hardware component of the client machine.

At step 330, the client machine requests a name server lookup from a tracker server specified by a tracker IP address, where the name server lookup comprises the identification. In some implementations, the client machine 110 runs a Domain Name System (DNS) resolver configuration file stored on the image of the VM. The DNS resolver configuration file can specify the tracker server 120 as a DNS name server. The tracker IP address can be stored on a configuration file for a DNS resolver for the virtual machine. The tracker IP address can additionally or alternatively be stored on an image of the VM.

In some implementations, the client machine 110 can execute nslookup command string. For example, the nslookup command string can be "nslookup <ID>.xrv9k.cisco.com 208.67.22.222", where "<ID>" refers to the unique identifier generated by the client machine 110 for the instance of the VM. The nslookup command string "<ID>.xrv9k.cisco.com 208.67.22.222" includes the unique identifier (<ID>), the domain name of the tracker server 120 (xrv9k.cisco.com), and the IP address of the tracker server (208.67.22.222). In some implementations, the name server lookup command, including the domain name of the tracker server 120 and the IP address of the tracker server 120, are stored on the image of the VM.

FIG. 4 illustrates an example methodology 400 for tracking usage of virtual machines by a tracker server. At step 410, the tracker server receives a name server lookup from a client machine located at a client Internet Protocol (IP) address, where the name server lookup comprises an identification for an instance of a virtual machine (VM) on the client machine.

For example, the name server lookup can be a nslookup command string "<ID>.xrv9k.cisco.com 208.67.22.222" that includes the unique identifier (<ID>) of the client machine, the domain name of the tracker server 120 (xrv9k.cisco.com), and the IP address of the tracker server (208.67.22.222).

At step 420, the tracker server determines VM usage information for the client machine, based on the identification and the client IP address. The tracker server 120 can determine based on the identification which particular VM version is running on the client machine 110. The tracker server 120 can also determine based on the identification which particular instance of the VM is running on the client machine 110. For example, the tracker server 120 can count the number of times a particular instance of a VM has been started from a single client IP address. The tracker server 120 can count the number of different instances of a VM has been started from a single client IP address. The tracker server can count the number of instances of a particular VM version has been started from a single client IP address. The client server 120 can also aggregate the VM usage information across multiple client machines to obtain usage information totals.

At step 430, the tracker server records the VM usage information. For example, the tracker server 120 can record the VM usage information into the VM tracker database 128.

Figure 5:
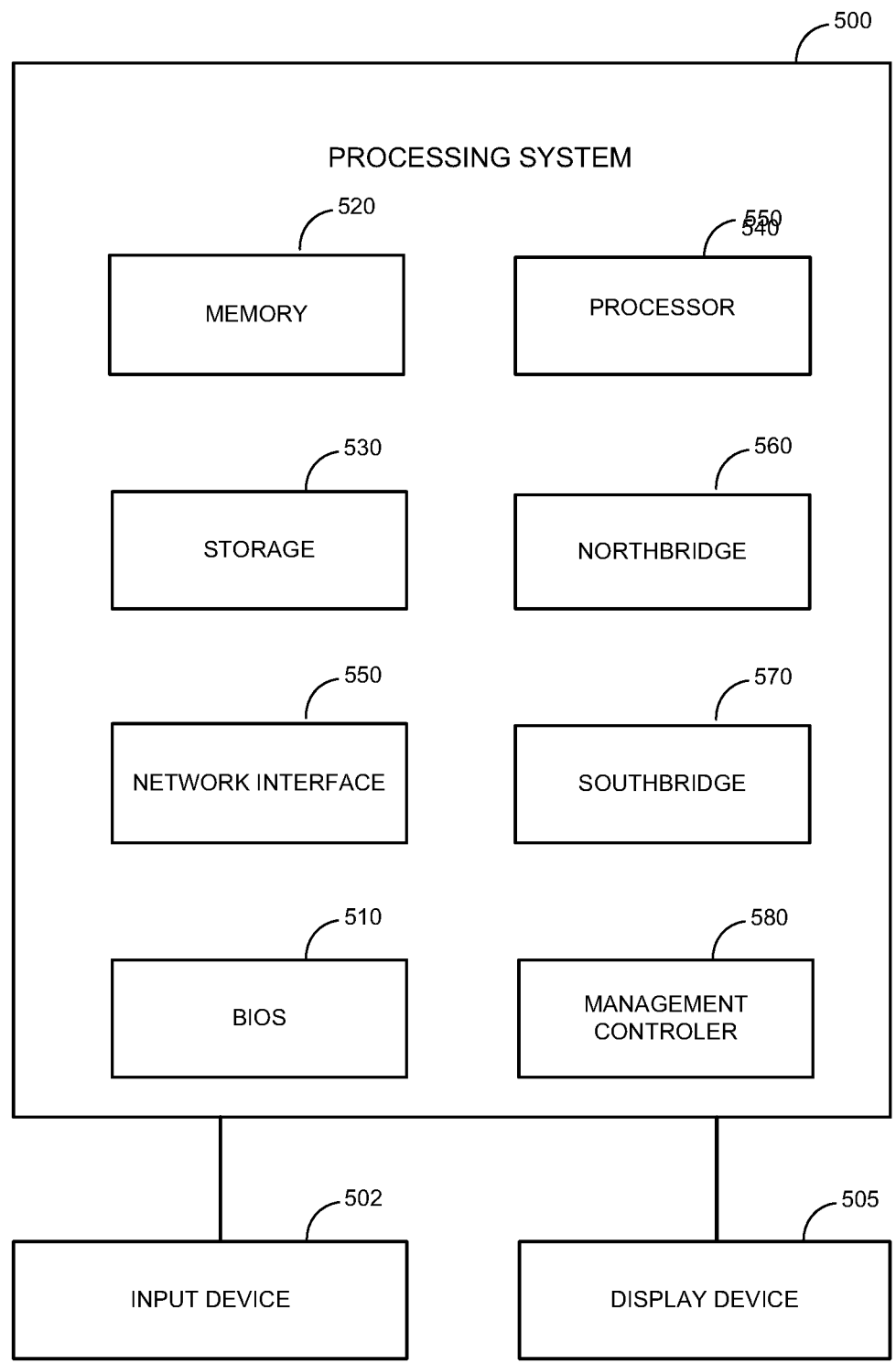
FIG. 5 illustrates a block diagram of an example computer system.

FIG. 5 illustrates a block diagram of an example processing system 500. The processing system 500 can include a processor 540, a network interface 550, a management controller 580, a memory 520, a storage 530, a Basic Input/Output System (BIOS) 510, and a northbridge 560, and a southbridge 570.

The processing system 500 can be, for example, a server (e.g., one of many rack servers in a data center) or a personal computer. The processor (e.g., central processing unit (CPU)) 540 can be a chip on a motherboard that can retrieve and execute programming instructions stored in the memory 520. The processor 540 can be a single CPU with a single processing core, a single CPU with multiple processing cores, or multiple CPUs. One or more buses (not shown) can transmit instructions and application data between various computer components such as the processor 540, memory 520, storage 530, and networking interface 550.

The memory 520 can include any physical device used to temporarily or permanently store data or programs, such as various forms of random-access memory (RAM). The storage 530 can include any physical device for non-volatile data storage such as a HDD or a flash drive. The storage 530 can have a greater capacity than the memory 520 and can be more economical per unit of storage, but can also have slower transfer rates.

The BIOS 510 can include a Basic Input/Output System or its successors or equivalents, such as an Extensible Firmware Interface (EFI) or Unified Extensible Firmware Interface (UEFI). The BIOS 510 can include a BIOS chip located on a motherboard of the processing system 500 storing a BIOS software program. The BIOS 510 can store firmware executed when the computer system is first powered on along with a set of configurations specified for the BIOS 510. The BIOS firmware and BIOS configurations can be stored in a non-volatile memory (e.g., NVRAM) 512 or a ROM such as flash memory. Flash memory is a non-volatile computer storage medium that can be electronically erased and reprogrammed.

The BIOS 510 can be loaded and executed as a sequence program each time the processing system 500 is started. The BIOS 510 can recognize, initialize, and test hardware present in a given computing system based on the set of configurations. The BIOS 510 can perform self-test, such as a Power-on-Self-Test (POST), on the processing system 500. This self-test can test functionality of various hardware components such as hard disk drives, optical reading devices, cooling devices, memory modules, expansion cards and the like. The BIOS can address and allocate an area in the memory 520 in to store an operating system. The BIOS 510 can then give control of the computer system to the OS.

The BIOS 510 of the processing system 500 can include a BIOS configuration that defines how the BIOS 510 controls various hardware components in the processing system 500. The BIOS configuration can determine the order in which the various hardware components in the processing system 500 are started. The BIOS 510 can provide an interface (e.g., BIOS setup utility) that allows a variety of different parameters to be set, which can be different from parameters in a BIOS default configuration. For example, a user (e.g., an administrator) can use the BIOS 510 to specify clock and bus speeds, specify what peripherals are attached to the computer system, specify monitoring of health (e.g., fan speeds and CPU temperature limits), and specify a variety of other parameters that affect overall performance and power usage of the computer system.

The management controller 580 can be a specialized microcontroller embedded on the motherboard of the computer system. For example, the management controller 580 can be a BMC or a RMC. The management controller 580 can manage the interface between system management software and platform hardware. Different types of sensors built into the computer system can report to the management controller 580 on parameters such as temperature, cooling fan speeds, power status, operating system status, etc. The management controller 580 can monitor the sensors and have the ability to send alerts to an administrator via the network interface 550 if any of the parameters do not stay within preset limits, indicating a potential failure of the system. The administrator can also remotely communicate with the management controller 580 to take some corrective action such as resetting or power cycling the system to restore functionality.

The northbridge 560 can be a chip on the motherboard that can be directly connected to the processor 540 or can be integrated into the processor 540. In some instances, the northbridge 560 and the southbridge 570 can be combined into a single die. The northbridge 560 and the southbridge 570, manage communications between the processor 540 and other parts of the motherboard. The northbridge 560 can manage tasks that require higher performance than the southbridge 570. The northbridge 560 can manage communications between the processor 540, the memory 520, and video controllers (not shown). In some instances, the northbridge 560 can include a video controller.

The southbridge 570 can be a chip on the motherboard connected to the northbridge 560, but unlike the northbridge 560, is not directly connected to the processor 540. The southbridge 570 can manage input/output functions (e.g., audio functions, BIOS, Universal Serial Bus (USB), Serial Advanced Technology Attachment (SATA), Peripheral Component Interconnect (PCI) bus, PCI eXtended (PCI-X) bus, PCI Express bus, Industry Standard Architecture (ISA) bus, Serial Peripheral Interface (SPI) bus, Enhanced Serial Peripheral Interface (eSPI) bus, System Management Bus (SMBus), etc.) of the processing system 500. The southbridge 570 can be connected to or can include within the southbridge 570 the management controller 570, Direct Memory Access (DMAs) controllers, Programmable Interrupt Controllers (PICs), and a real-time clock.

The input device 502 can be at least one of a game controller, a joystick, a mouse, a keyboard, a touchscreen, a trackpad, or other similar control device. The input device 502 allows a user to provide input data to the processing system 500.

The display device 504 can be at least one of a monitor, a light-emitting display (LED) screen, a liquid crystal display (LCD) screen, a head mounted display (HMD), a virtual reality (VR) display, a augmented reality (AR) display, or other such output device. The display device 504 allows the processing system 500 to output visual information to a user.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A method for tracking virtual machine (VM) usage, by a client machine, the method comprising:
   deploying an instance of a VM;
   generating an identification for the instance of the VM that is unique to the instance of the VM; and
   sending, from the client machine, a name server lookup request including the identification of the instance of the VM and a client identification of the client machine to a tracker server to cause the tracker server to record, in a VM tracker database of the tracker server, a record of a startup of the instance of the VM as part of VM usage information indicating a total number of startups of the instance of the VM at the client machine, wherein the name server lookup request is sent in response to execution of a name server lookup command included in an image of the VM that is executed in deploying the instance of the VM and the tracker server specified by a tracker internet protocol (IP) address based on the identification.

2. The method of claim 1, wherein the client machine is connected to a wide area network.

3. The method of claim 1, further comprising:
   receiving an image of the VM by the client machine.

4. The method of claim 1, wherein the tracker IP address is stored in a configuration file for a domain name system (DNS) resolver for the VM.

5. The method of claim 1, wherein the tracker IP address is stored on the image of the VM.

6. The method of claim 1, further comprising:
   performing a configuration for the VM.

7. The method of claim 1, wherein generating the identification comprises generating a randomized string of a determined length.

8. The method of claim 1, wherein the identification comprises a VM version identification for a VM version of the VM.

9. The method of claim 1, wherein the identification comprises hardware component identification for the client machine.

10. A method for tracking virtual machine (VM) usage, by a tracker server, the method comprising:
    receiving a name server lookup request from a client machine located at a client Internet Protocol (IP) address, the name server lookup request including an identification for an instance of a VM on the client machine, wherein the identification is unique to the instance of the VM and the name server lookup request is sent in response to execution of a name server lookup command included in an image of the VM that is executed in deploying the instance of the VM;
    determining whether the client machine is new, whether the instance of the VM is new, and a VM version of the VM, the determining based on the identification and the client IP address; and
    recording, in a VM tracker database of the tracker server, a startup of the instance of the VM as part of VM usage information indicating a total number of startups of the instance of the VM at the client machine based on receipt of the name server lookup request.

11. The method of claim 10, further comprising:
    creating a statistical record of deployment of the VM; and
    determining resources to support the VM based on the statistical record.

12. The method of claim 10, further comprising:
    determining a number of times the instance of the VM has been deployed by the client machine based on the VM usage information.

13. The method of claim 10, further comprising:
    determining a count of deployed instances of the VM by the client machine based on the VM usage information.

14. The method of claim 10, further comprising:
determining a count of deployments of a software version of the VM based on the VM usage information.

15. The method of claim 10, further comprising:
determining a count of deployments from the client IP address based on the VM usage information.

16. A device for tracking virtual machine (VM) usage, the device comprising:
at least one processor configured to:
deploy an instance of a VM;
generate an identification for the instance of the VM that is unique to the instance of the VM; and
send, from the device, a name server lookup request including the identification of the instance of the VM and a client identification of the client machine to a tracker server to cause the tracker server to record, in a VM tracker database of the tracker server, a record of a startup of the instance of the VM as part of VM usage information indicating a total number of startups of the instance of the VM at the client machine wherein the name server lookup request is sent in response to execution of a name server lookup command included in an image of the VM that is executed in deploying the instance of the VM and the tracker server specified by a tracker IP address based on the identification; and
a memory coupled to the processor for storing data.

17. The device of claim 16, wherein the at least one processor is further configured to receive the image of the VM.

18. The device of claim 16, wherein the at least one processor is further configured to perform a configuration for the VM.

19. The device of claim 16, wherein the identification comprises a randomized string of a determined length.

\* \* \* \* \*